(12) United States Patent
Leydier

(10) Patent No.: US 11,383,763 B2
(45) Date of Patent: Jul. 12, 2022

(54) METHOD FOR COMPENSATING FOR TRAJECTORY DEVIATION WHEN BRAKING WITH POWER STEERING

(71) Applicant: JTEKT EUROPE, Irigny (FR)

(72) Inventor: Luc Leydier, Feyzin (FR)

(73) Assignee: JTEKT EUROPE, Irigny (FR)

(*) Notice: Subject to any disclaimer, the term of this patent is extended or adjusted under 35 U.S.C. 154(b) by 196 days.

(21) Appl. No.: 16/961,605

(22) PCT Filed: Jan. 7, 2019

(86) PCT No.: PCT/FR2019/050026
§ 371 (c)(1),
(2) Date: Jul. 10, 2020

(87) PCT Pub. No.: WO2019/138178
PCT Pub. Date: Jul. 18, 2019

(65) Prior Publication Data
US 2021/0061349 A1    Mar. 4, 2021

(30) Foreign Application Priority Data
Jan. 10, 2018 (FR) ..................... 18/50203

(51) Int. Cl.
*B62D 6/00* (2006.01)
(52) U.S. Cl.
CPC ..................... *B62D 6/00* (2013.01)

(58) Field of Classification Search
CPC ....................................................... B62D 6/00
See application file for complete search history.

(56) References Cited

FOREIGN PATENT DOCUMENTS

| DE | 10 2006 044 088 A1 | 4/2008 |
|----|----|----|
| DE | 10 2014 211 452 A1 | 2/2015 |
| EP | 0 846 610 A2 | 6/1998 |
| EP | 1 209 053 A1 | 5/2002 |
| EP | 1 424 263 A2 | 6/2004 |
| EP | 1 905 670 A2 | 4/2008 |
| GB | 2 259 892 A | 3/1993 |
| WO | 2005/054040 A1 | 6/2005 |

OTHER PUBLICATIONS

Apr. 29, 2019 International Search Report issued in International Patent Application No. PCT/FR2019/050026.
Apr. 29, 2019 Written Opinion of the International Searching Authority issued in International Patent Application No. PCT/FR2019/050026.

*Primary Examiner* — Mathew Franklin Gordon
(74) *Attorney, Agent, or Firm* — Oliff PLC

(57) ABSTRACT

A method for a power steering system of a motor vehicle delivering, to the steering, a torque controlled by a computer for compensating for trajectory deviation of the vehicle when this vehicle is braking, which, from a request to activate the method while braking, in a first step, calculates a rough correction torque taking into account the speed of the vehicle, the yaw of this vehicle, and a signal representing the force applied by the steering to the steered wheels.

13 Claims, 1 Drawing Sheet

METHOD FOR COMPENSATING FOR TRAJECTORY DEVIATION WHEN BRAKING WITH POWER STEERING

The present invention concerns a method for compensating a course deviation during brakings of a motor vehicle, by the power steering system of this vehicle, as well as a power steering system including means implementing such a compensation method.

Some motor vehicles include a power steering system piloted by a calculator, comprising a motor generating a force or a torque on the steering of the vehicle, which depends on the torque applied by the driver on the steering wheel measured by a sensor of the intent of the driver, in order to supply part of the force necessary for pivoting of the steered wheels.

In particular, the power steering system may include one or several electric motor(s) piloted by the calculator, generating a motor torque which may be applied in different ways on the steering column or on the steering case.

Moreover, during a braking of the vehicle, this braking may generate, because of the asymmetry of the vehicle, a force that tends to cause the deviation thereof on one side or the other.

In particular, the braking capacities of the wheels may be slightly different on both sides of the vehicle, because of variations in the operation of the braking systems of each wheel, or variations of the control pressures applied thereon.

The geometries of the undercarriages or the operation of the suspension systems comprising the springs and the shock-absorbers, may also have little deviations on one side or the other of the vehicle, because of manufacturing dispersions.

The masses of the vehicle and the masses on-board this vehicle may also have different distributions, in particular with one driver alone on one side of this vehicle, or passengers rather loading the other side.

The deviation during the braking of the vehicle also depends on the type of front and rear undercarriages that are used, some undercarriage geometries being more sensitive to these deviations than others.

These different reasons may cause a deviation of the vehicle during brakings, which generally amplifies for abrupt brakings or high speeds. In particular, an emergency braking at high speeds, for example higher than 100 km/h, may cause a deviation of the vehicle which surprises the driver by generating a feeling of loss of accuracy of the steering, and of insecurity.

The driver then should apply a force on the steering wheel to correct the course, which adds an inopportune stress in particular in emergency situations.

The present invention aims, in particular, at avoiding these drawbacks of the prior art.

To this end, it provides a method for a power steering system of a motor vehicle generating on the steering a torque piloted by a calculator, for compensating a deviation of the course of the vehicle during brakings of this vehicle, this method being remarkable in that, starting from a request for activating the method during a braking, in a first step, it calculates a raw correction torque taking into account the speed of the vehicle, a yaw rate of this vehicle, and a signal representing the force applied by the steering on the steered wheels.

One advantage of this compensation method lies in that, in a simple and economical way, without adding any equipment in the vehicle, using available signals, the first step deduces the magnitude of the course deviation, and a raw correction torque that would be necessary, by taking into account the variations of the yaw rate and the force applied by the steered wheels on the steering case.

The second step allows safeguarding this raw correction torque by avoiding an amplification of the deviation phenomenon through a correction applied in the wrong direction. A force generated by the power steering resisting, at least partially, the course deviation, is automatically obtained, which reassures the driver and improves safety.

The compensation method according to the invention may further include one or more of the following features, which may be combined together.

Advantageously, the activation request uses signals that are internal to the power steering system, and external signals originating from the on-board network of the vehicle comprising information on the operation of this vehicle, to establish this activation request.

Advantageously, the first step establishes a first correction torque dependent of the force applied by the steering, from a first mapping, in order to reduce this applied force.

Advantageously, the first step establishes a second correction torque dependent of the yaw rate, from a second mapping.

Advantageously, the yaw rate is filtered so as to attenuate some frequencies.

Advantageously, the first step establishes a third correction torque dependent of the derivative of the yaw rate, from a third mapping, in order to reduce the derivative of this yaw rate.

In this case, advantageously, the method performs a filtering of the derivative of the yaw rate before using it for the third mapping. By this filtering, some undesirable frequencies of this signal are eliminated.

Advantageously, the method takes into account the speed of the vehicle to establish the first, second and third correction torques. This consideration allows establishing a dynamic correction dependent of the evolution of the speed of the vehicle.

Advantageously, the raw correction torque is weighted by a coefficient dependent of a time period elapsed since the activation request. This coefficient varies between 0 and 1.

In this manner, the method allows setting a time period during which the compensation method applies. Indeed, in the case where the deviation phenomenon would last more than 2 or 3 sec, it is preferable to progressively deactivate the function in order not to disturb the driver.

More specifically, the deviation phenomenon being related to a braking, it could last only for a limited time because in the event of a strong braking at 100 km/h, the vehicle speed would be about 30 km/h after 2 seconds of braking and the vehicle would have stopped after about 3 seconds of braking. Since the course deviation phenomenon is not dangerous at low vehicle speed, it is preferable, for reasons related to the quality of driving perceived by the driver, to limit the action of the compensation method.

Advantageously, in a second step, the method calculates a safe correction torque applied by the power steering system, by setting limits to the raw correction torque.

In this case, advantageously, the safe correction torque is established by setting an upper limit and a lower limit to the raw correction torque, each being dependent of the sign and of the level of the signal of the force applied by the steering.

In addition, advantageously, each upper or lower limit includes a specific value level for a correction torque in a direction opposite to that of the force applied by the steering, and a value level lower than this specific value level for a correction torque in the same direction. In this manner, strong corrections in the same direction that would amplify the deviation are avoided.

Another object of the invention is a power steering system for a motor vehicle, including means implementing a compensation method comprising any one of the preceding features.

The invention will be better understood and other features and advantages will appear more clearly on reading the description hereinafter provided as example, with reference to the appended drawings in which.

Figure 1:
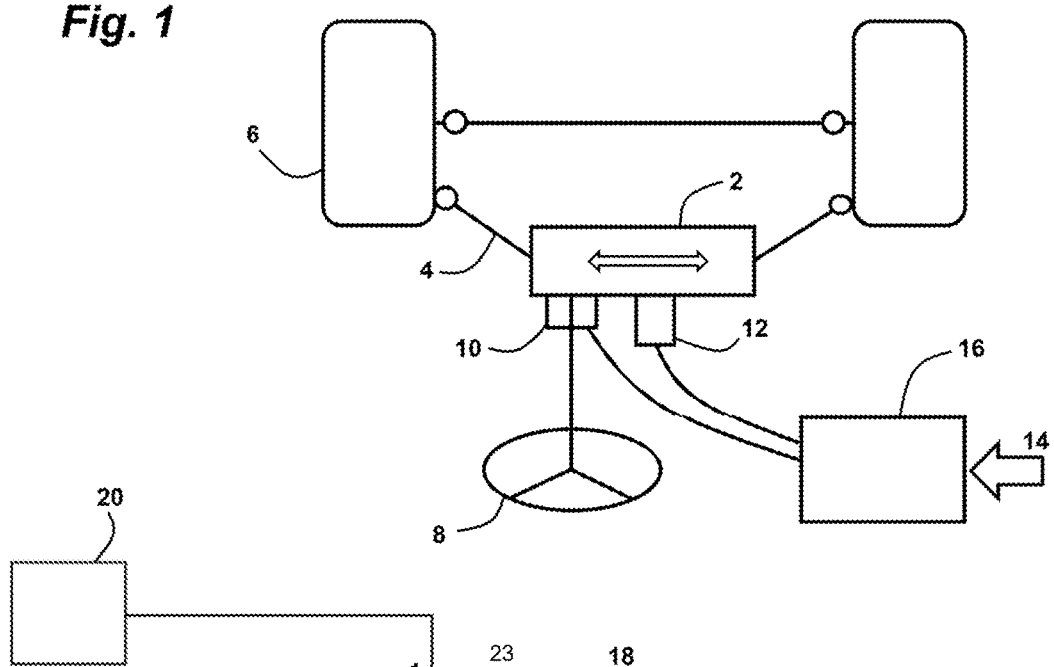
FIG. 1 is a diagram of a motor vehicle steering implementing a compensation method according to the invention.

FIG. 1 presents a steering case 2 including a rack disposed transversely in the vehicle, each end thereof is linked by a tie rod 4 to a front wheel hub 6 so as to make it pivot, thereby ensuring steering of the vehicle.

A steering column equipped with a steering wheel 8 maneuvered by the driver, linked to the case 2, includes a sensor 10 for sensing the force applied by the driver on this column, constituting a device for measuring the intent of the driver.

An electric drive 12 includes an electric motor generating an assist torque on the steering case 2, which adds to the force generated by the driver on the steering wheel 8. Alternatively, the electric drive 12 may include several independent drive systems, working in parallel, so as to achieve a redundancy ensuring safety in the event of a failure of one of these drives.

A calculator 16 receives the signal output by the force sensor 10 as well as different information on the operation of the vehicle 14, to establish a torque setpoint transmitted to the electric drive 12, in order to apply this assist torque on the steering case 2.

In return, the calculator 16 calculates from the different measurements performed thereby, a signal representing the force applied by the steering 2 on the steered wheels 6, used thereby to establish the torque setpoint of the electric drive 12.

Figure 2:
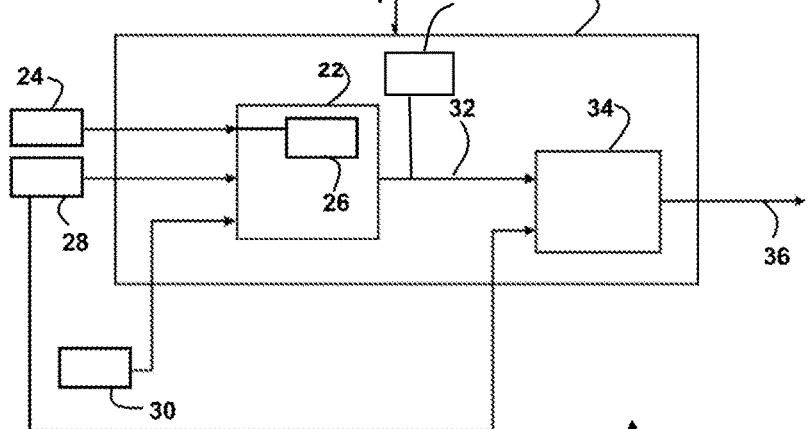
FIG. 2 is a block diagram presenting the operation of this compensation method.

FIG. 2 presents, in a preliminary step 20, a function for estimating a course deviation during an ongoing braking, which results in the construction of a signal of a request for activating the compensation method. In particular, the course deviation estimation function uses signals that are internal to the power steering, and external signals originating from the on-board network of the vehicle transmitting different information on the operation of this vehicle.

In particular, the estimate of a course deviation may be established from a detection of a high vehicle speed, and of a strong braking, measured for example by the braking torque applied on the brakes of the wheels, or by a strong negative longitudinal acceleration indicated by an inertial unit. The deviation estimate may also be provided by a signal coming from a stability control function of the vehicle, called «ESP», standing for «Electronic Stability Program».

In this case, there is a significant risk of course deviation, and the deviation estimation function sends a signal at the level 1 to a correction torque calculation function 18, requesting it to calculate the course correction.

In a first step 22, the correction torque calculation function 18 carries out the reception of the signal of the force applied by the steering 28, and the reception of a signal of the yaw rate of the vehicle 24 corresponding to the rotational speed of the vehicle relative to a vertical axis, provided by an inertial unit provided in particular for the operation of a stability control function of the vehicle, and then performs the calculation of the derivative 26 of this yaw rate. It should be noted that the yaw rate depends on the inclination of the steered wheels, and on the linear speed of the vehicle.

Advantageously, the raw yaw rate is filtered to attenuate some frequencies. Afterwards, the first step 22 includes the calculation of a first correction torque dependent of the force applied by the steering 28, of a second correction torque dependent of the yaw rate of the vehicle 24, and of a third correction torque dependent of the derivative of this yaw rate. These three calculated torques are added so as to form a raw correction torque 32.

The correction torque dependent of the force applied by the steering 28 is calculated from a first mapping dependent of this force signal, which may include a setting, for example according to the speed of the vehicle, to best adapt this correction torque.

In a straight line, the force applied by the steering 28 is zero, reaching a deviation compensated by holding of the steering wheel by the driver, is detected by a rise of this force, that the correction torque dependent of the force will tend to reduce to assist the driver.

Figure 3:
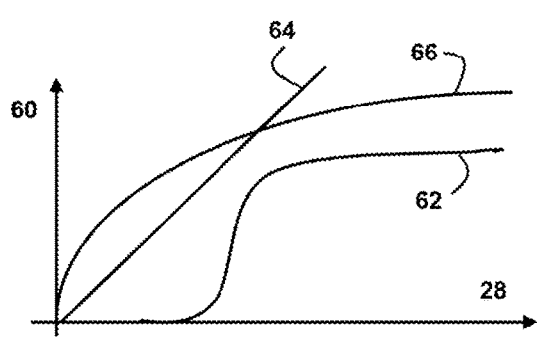
FIG. 3 is a mapping presenting several curves of the raw correction torque as a function of the force applied by the steering.

FIG. 3 presents a mapping comprising, as a function of the force applied by the steering 28, three curves 62, 64, 66 providing the correction torque dependent of this force 60.

The first curve 62 provides no correction torque until a steering force threshold, and then a quick rise in the correction which stabilizes afterwards at a slightly increasing value. The second curve 64 provides a correction torque that is directly proportional to the steering force. The third curve 66 provides a correction torque having a vertical tangent at the start of the steering force 28, and then a slope that decreases progressively until terminating in a slightly increasing value.

We obtain, for the first curve 62, a delayed correction after some rise in the force applied by the steering 28, for the second curve 64, an immediate proportional correction and, for the third curve 66, an early correction which starts strongly as of the start of this force. These different curves present a correction that gets more and more intrusive.

The correction torque dependent of the yaw rate is calculated from a second mapping dependent of this yaw rate signal. The derivative of the yaw rate 24 provided by the derivative calculation 26, is filtered so as to attenuate some frequencies and obtain a signal that is used in a third mapping which provides the correction torque dependent of the derivative.

If the course deviation is not completely compensated by the correction torque dependent of the force applied by the steering 28, an increasing yaw rate 24 is obtained, justifying the second correction torque dependent of this yaw rate.

The deviation compensation may operate in a turn, in this case, a constant yaw rate should be maintained by correcting a variation of this rate.

The derivative of the yaw rate 26 detects a variation of the yaw rate 24, the consideration of which allows stabilizing the vehicle by limiting the variations of this yaw rate. In this manner, we seek to maintain a constant yaw rate 24.

In particular, the different correction torques may be adjusted according to the speed of the vehicle, either in a general way on the raw correction torque 32, or in an independent way on each of these correction torques. These adjustments allow obtaining a raw correction torque 32 adapted to each speed of the vehicle because the seriousness of the vehicle deviation phenomenon during braking increases with this speed.

The consideration of the speed of the vehicle also allows reducing the raw correction torque in a dynamic way during the braking. A decreasing speed during the braking reduces the magnitude of the deviation of the vehicle, the dynamic correction takes into account this reduction so as to reduce the correction and avoid a deviation compensation that is too intrusive for the driver.

The raw correction torque is weighted by a coefficient 23 dependent of a time period elapsed since the activation request. This coefficient varies between 0 and 1.

A second step 34 includes the reception of the raw correction torque 32 as well as the signal of the force applied by the steering 28, to establish a safe correction torque 36.

The sign of the safe correction torque 36 must impart a force opposite to the direction of the deviation to correct it, in order to avoid this correction torque amplifying the deviation phenomenon.

Figure 4:
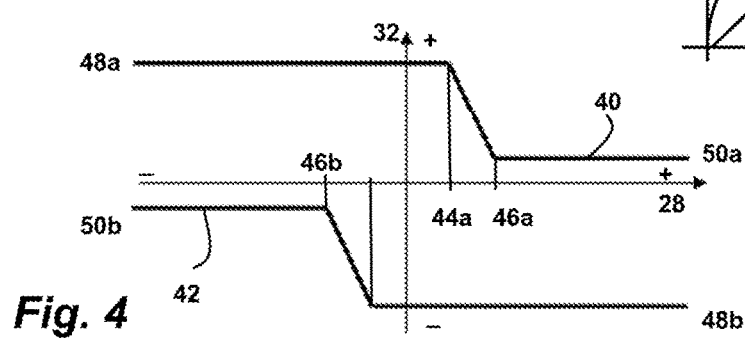
FIG. 4 presents the operating principle of the second step of this method.

Depending on the signal of the force applied by the steering 28, FIG. 4 presents on the horizontal axis comprising a positive direction oriented rightwards, an upper limit 40 and a lower limit 42 forming saturations of the raw correction torque 32 comprising a positive direction oriented upwards. These two positive directions apply for the vehicle in the same direction.

The two upper and lower limits 40, 42 are symmetrical with respect to the central point O of the graph.

As regards the upper limit 40 ranging towards the positive values, when the force applied by the steering 28 is negative, or slightly positive below a first threshold 44a, this upper limit is at a high positive level 48a. Between this first threshold 44a and a close second threshold 46a, the upper limit 40 decreases linearly, and then beyond this second threshold, this upper limit is at a low positive level 50a.

Symmetrically, as regards the lower limit 42 ranging towards the negative values, when the force applied by the steering 28 is positive, or slightly negative above a first threshold 44b, this lower limit is a high negative level 48b. Between this first threshold 44b and a close second threshold 46b, the lower limit 42 increases linearly, and then below this second threshold, this lower limit is at a low negative level 50b.

In this manner, a safe correction torque 36 is ensured having a value saturated by a high level 48a, 48b when it is in the direction opposite to the force applied by the steering 28, or by a low level 50a, 50b when it is in the same direction, which avoids errors that would considerably amplify the course deviation.

Using components and sensors that are present in the vehicle, with only some software add-ons, we obtain, in a reliable and economical way, a course deviation compensation which safeguards driving and reassures the driver.

The invention claimed is:

1. A method for a power steering system of a motor vehicle generating on the steering a torque piloted by a calculator, for compensating a deviation of the course of the vehicle during brakings of this vehicle, wherein, starting from a request for activating the method during a braking, in a first step, it calculates a raw correction torque taking into account the speed of the vehicle, a yaw rate of this vehicle, and a signal representing the force applied by the steering on the steered wheels.

2. The compensation method according to claim 1, wherein its activation request uses signals that are internal to the power steering system, and external signals originating from the on-board network of the vehicle comprising information on the operation of this vehicle, to establish this activation request.

3. The compensation method according to claim 1, wherein the first step establishes a first correction torque dependent of the force applied by the steering, from a first mapping, in order to reduce this applied force.

4. The compensation method according to claim 1, wherein the first step establishes a second correction torque dependent of the yaw rate, from a second mapping.

5. The compensation method according to claim 4, wherein the yaw rate is filtered so as to attenuate some frequencies.

6. The compensation method according to claim 4, wherein the first step establishes a third correction torque dependent of the derivative of the yaw rate, from a third mapping, in order to reduce the derivative of this yaw rate.

7. The compensation method according to claim 6, wherein it performs a filtering of the derivative of the yaw rate before using it for the third mapping.

8. The compensation method according to claim 4, wherein it takes into account the speed of the vehicle to establish the first, second and third correction torques.

9. The compensation method according to claim 1, wherein the raw correction torque is weighted by a coefficient dependent of a time period elapsed since the activation request.

10. The compensation method according to claim 1, wherein in a second step, it calculates a safe correction torque applied by the power steering system, by setting limits to the raw correction torque.

11. The compensation method according to claim 10, wherein the safe correction torque is established by setting an upper limit and a lower limit to the raw correction torque, each being dependent of the sign and of the level of the signal of the force applied by the steering.

12. The compensation method according to claim 11, wherein each upper or lower limit includes a specific value level for a correction torque in a direction opposite to that of the force applied by the steering, and a value level lower than this specific value level for a correction torque in the same direction.

13. A power steering system for a motor vehicle, wherein it includes means implementing a compensation method according to claim 1.

* * * * *